(12) United States Patent
Kishii

(10) Patent No.: US 8,702,826 B2
(45) Date of Patent: Apr. 22, 2014

(54) ABRASIVE AGENT, METHOD FOR PRODUCING ABRASIVE AGENTS, AND ELECTRONIC DEVICE

(71) Applicant: Fujitsu Limited, Kawasaki (JP)

(72) Inventor: Sadahiro Kishii, Isehara (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/856,516

(22) Filed: Apr. 4, 2013

(65) Prior Publication Data

US 2013/0333298 A1 Dec. 19, 2013

(30) Foreign Application Priority Data

Jun. 14, 2012 (JP) ................. 2012-135256

(51) Int. Cl.
*C09G 1/02* (2006.01)
*H01L 21/02* (2006.01)

(52) U.S. Cl.
USPC .............................. 51/307; 134/1.3

(58) Field of Classification Search
USPC .................. 51/307; 134/1.3, 2; 510/175
See application file for complete search history.

(56) References Cited

U.S. PATENT DOCUMENTS

| | | | |
|---|---|---|---|
| 5,611,829 A | 3/1997 | Monroe | |
| 5,645,619 A | 7/1997 | Erickson | |
| 5,763,325 A | 6/1998 | Kishii | |
| 5,877,089 A | 3/1999 | Kishii | |
| 6,114,247 A | 9/2000 | Nakamura | |
| 6,159,858 A | 12/2000 | Kishii | |
| 2012/0240478 A1 | 9/2012 | Horiuchi | |

FOREIGN PATENT DOCUMENTS

| | | |
|---|---|---|
| JP | H9-22887 | 1/1997 |
| JP | H9-22888 | 1/1997 |
| JP | H9-186119 | 7/1997 |
| JP | H10-71571 | 3/1998 |
| JP | H11-509241 | 8/1998 |
| JP | H11-349927 | 12/1999 |
| JP | 3927270 B2 | 6/2007 |
| JP | 2011-121153 A1 | 6/2011 |

OTHER PUBLICATIONS

S. Kishii, et al.; "Tungsten Film Chemical Mechanical Polishing Using MnO2 Slurry;" Japanese Journal of Applied Physics; vol. 50; 2011; pp. 076502-1-076502-4 (4 Sheets).
S. Kishii, et al.; "Mn2O3 Slurry Reuse by Circulation Achieving High Constant Removal Rate;" Japanese Journal of Applied Physics; vol. 51; 2012; pp. 04DB07-1-04DB07-5 (5 Sheets).
S. Kishii, et al.; "Dielectric SiO2 Planarization Using MnO2 Slurry;" Japanese Journal of Applied Physics; vol. 51; 2012; pp. 016501-1-016501-5 (5 Sheets).
S. Kishii et al.; "Mn2O3 Slurry Achieving Reduction of Slurry Waste;" Japanese Journal of Applied Physics; vol. 51; 2012; pp. 046506-1-046506-6 (6 Sheets).

*Primary Examiner* — Pegah Parvini
(74) *Attorney, Agent, or Firm* — Kratz, Quintos & Hanson, LLP

(57) ABSTRACT

A method for producing abrasive agents includes: adding a silica to a manganese compound; heat-treating the manganese compound to which the silica has been added; forming abrasive grains by milling the manganese compound to which the silica has been added and which has been heat-treated; and adding a solvent to the abrasive grains.

7 Claims, 13 Drawing Sheets

FIG. 3A

| | STARTING MATERIAL | HEAT TREATMENT FURNACE | TREATMENT TEMP. (°C) | ADDITION OF SILICA | NUMBER OF MILLING CYCLES | EXPERIMENTAL RESULTS (FIG.) |
|---|---|---|---|---|---|---|
| A-1 | MnO$_2$ | ROTARY KILN | 450 | BEFORE HEAT TREATMENT | 1, 3, 5, 7, 10 | FIG. 4 |
| B-1 | MnO$_2$ | ROTARY KILN | 450 | AFTER HEAT TREATMENT | 1, 3, 5, 7, 10 | FIG. 4 |
| C-1 | MnO$_2$ | ROTARY KILN | 450 | NOT ADDED | 1, 3, 5, 7, 10 | FIG. 4 |
| A-2 | MnO$_2$ | ROTARY KILN | 800 | BEFORE HEAT TREATMENT | 1, 3, 5, 7, 10 | FIG. 5 |
| B-2 | MnO$_2$ | ROTARY KILN | 800 | AFTER HEAT TREATMENT | 1, 3, 5, 7, 10 | FIG. 5 |
| C-2 | MnO$_2$ | ROTARY KILN | 800 | NOT ADDED | 1, 3, 5, 7, 10 | FIG. 5 |
| A-3 | MnO$_2$ | ROTARY KILN | 900 | BEFORE HEAT TREATMENT | 1, 3, 5, 7, 10 | FIG. 6 |
| B-3 | MnO$_2$ | ROTARY KILN | 900 | AFTER HEAT TREATMENT | 1, 3, 5, 7, 10 | FIG. 6 |
| C-3 | MnO$_2$ | ROTARY KILN | 900 | NOT ADDED | 1, 3, 5, 7, 10 | FIG. 6 |
| A-4 | MnO$_2$ | ROTARY KILN | 1000 | BEFORE HEAT TREATMENT | 1, 3, 5, 7, 10 | FIG. 7 |
| B-4 | MnO$_2$ | ROTARY KILN | 1000 | AFTER HEAT TREATMENT | 1, 3, 5, 7, 10 | FIG. 7 |
| C-4 | MnO$_2$ | ROTARY KILN | 1000 | NOT ADDED | 1, 3, 5, 7, 10 | FIG. 7 |
| A-5 | MnO$_2$ | MUFFLE FURNACE | 900 | BEFORE HEAT TREATMENT | 1, 3, 5, 7, 10 | FIG. 8 |
| B-5 | MnO$_2$ | MUFFLE FURNACE | 900 | AFTER HEAT TREATMENT | 1, 3, 5, 7, 10 | FIG. 8 |
| C-5 | MnO$_2$ | MUFFLE FURNACE | 900 | NOT ADDED | 1, 3, 5, 7, 10 | FIG. 8 |

FIG. 3B

| | STARTING MATERIAL | HEAT TREATMENT FURNACE | TREATMENT TEMP. (°C) | ADDITION OF SILICA | NUMBER OF MILLING CYCLES | EXPERIMENTAL RESULTS (FIG.) |
|---|---|---|---|---|---|---|
| A-6 | $MnCO_3$ | ROTARY KILN | 900 | BEFORE HEAT TREATMENT | 1, 3, 10 | FIG. 9 |
| B-6 | $MnCO_3$ | ROTARY KILN | 900 | AFTER HEAT TREATMENT | 1, 3, 10 | FIG. 9 |
| C-6 | $MnCO_3$ | ROTARY KILN | 900 | NOT ADDED | 1, 3, 10 | FIG. 9 |
| A-7 | $MnCO_3$ | MUFFLE FURNACE | 900 | BEFORE HEAT TREATMENT | 1, 3, 10 | FIG. 10 |
| B-7 | $MnCO_3$ | MUFFLE FURNACE | 900 | AFTER HEAT TREATMENT | 1, 3, 10 | FIG. 10 |
| C-7 | $MnCO_3$ | MUFFLE FURNACE | 900 | NOT ADDED | 1, 3, 10 | FIG. 10 |
| A-8 | $Mn(OH)_2$ | ROTARY KILN | 900 | BEFORE HEAT TREATMENT | 1, 3, 10 | FIG. 11 |
| B-8 | $Mn(OH)_2$ | ROTARY KILN | 900 | AFTER HEAT TREATMENT | 1, 3, 10 | FIG. 11 |
| C-8 | $Mn(OH)_2$ | ROTARY KILN | 900 | NOT ADDED | 1, 3, 10 | FIG. 11 |
| A-9 | $Mn(OH)_2$ | MUFFLE FURNACE | 900 | BEFORE HEAT TREATMENT | 1, 3, 10 | FIG. 12 |
| B-9 | $Mn(OH)_2$ | MUFFLE FURNACE | 900 | AFTER HEAT TREATMENT | 1, 3, 10 | FIG. 12 |
| C-9 | $Mn(OH)_2$ | MUFFLE FURNACE | 900 | NOT ADDED | 1, 3, 10 | FIG. 12 |

ABRASIVE AGENT, METHOD FOR PRODUCING ABRASIVE AGENTS, AND ELECTRONIC DEVICE

CROSS-REFERENCE TO RELATED APPLICATION

This application is based upon and claims the benefit of priority of the prior Japanese Patent Application No. 2012-135256, filed on Jun. 14, 2012, the entire contents of which are incorporated herein by reference.

FIELD

The embodiments discussed herein are related to an abrasive agent and a method for producing abrasive agents.

BACKGROUND

Substrates such as glass substrates for hard disks and glass substrates used in devices such as liquid crystal displays are expected to be flat with high accuracy. Thus, these substrates are planarized by polishing. Whether or not planarization is accomplished successfully and efficiently is affected by abrasive grains contained in an abrasive agent.

Thus, various abrasive agents and abrasive grains have been proposed. For example, an abrasive agent containing cerium oxide ($CeO_2$) as abrasive grains exhibits a high polishing rate and thus has been used widely. Japanese Patent No. 3927270 is an example of related art.

Because cerium is a rare earth metal, however, alternative abrasive agents with a high polishing rate as substitutes for cerium oxide ($CeO_2$) have been desired.

SUMMARY

According to an aspect of the embodiments, a method for producing abrasive agents includes: adding a silica to a manganese compound; heat-treating the manganese compound to which the silica has been added; forming abrasive grains by milling the manganese compound to which the silica has been added and which has been heat-treated; and adding a solvent to the abrasive grains.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A illustrates experimental conditions;

FIG. 3B illustrates experimental conditions;

DESCRIPTION OF EMBODIMENTS

Hereinafter, embodiments will be described with reference to the drawings. The configurations of the embodiments are exemplary and are not restrictive.

Figure 1:
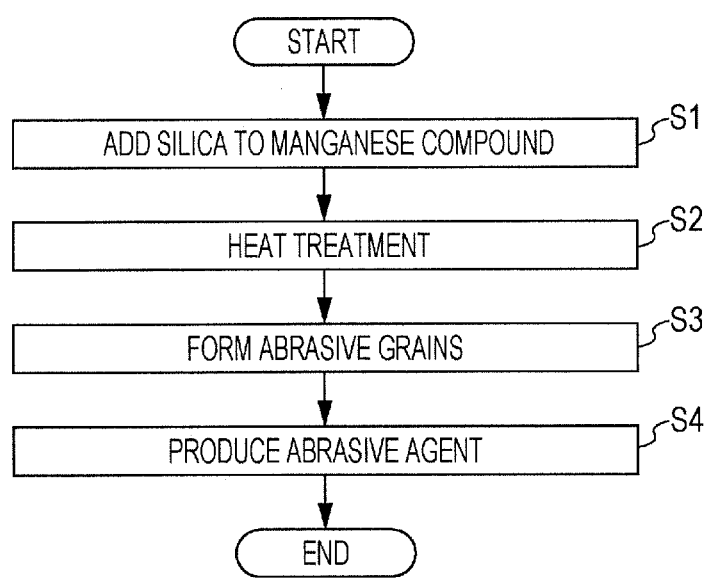
FIG. 1 is a flowchart representing a method for producing abrasive agents according to an embodiment.

FIG. 1 illustrates a method for producing an abrasive agent (an abrasive slurry) according to this embodiment. First, a silica ($SiO_2$) is added to a manganese compound in the step S1 in FIG. 1. Examples of the manganese compounds include manganese (IV) oxide ($MnO_2$), manganese (II) carbonate ($MnCO_3$), and manganese (II) hydroxide ($Mn(OH)_2$). For example, a colloidal silica or a fumed silica may be used as the silica. In this case, the silica is added to the manganese compound such that the concentration of the silica relative to the manganese compound becomes a predetermined concentration. For example, the predetermined concentration is preferably not less than 2 wt % and not more than 10 wt %.

For example, the silica may be added to the manganese compound in such a manner that the silica is added to a mixture of water and the manganese compound (water:manganese compound weight ratio 3:2). The manganese compound may be a reagent, or may be in the form of finely milled particles obtained by pulverizing a mass of the manganese compound.

Next, the manganese compound to which the silica has been added is heat-treated in the step S2 in FIG. 1. For example, the heat-treatment is performed at a temperature of not less than 450° C. and not more than 1000° C., preferably not less than 800° C. and not more than 1000° C., and still more preferably about 900° C. However, the temperature in the heat-treatment is not limited thereto and may be different from the above temperatures. The heat-treatment is carried out in the atmosphere using, for example, a heat-treatment furnace (a firing furnace) such as a rotary kiln or a muffle furnace. In the case of a rotary kiln, the heat-treatment time is, for example, about not less than 20 seconds and not more than 40 seconds. With a muffle furnace, the heat-treatment time is, for example, about 2 hours.

When a rotary kiln is used for the heat-treatment, the heat-treatment is performed after the manganese compound and the silica are granulated. In the case where a muffle furnace is used for the heat-treatment, the heat-treatment may be carried out after the manganese compound and the silica are granulated or without the granulation of the manganese compound and the silica. For example, the manganese compound and the silica may be granulated with a granulator such as a high speed mixer (manufactured by EARTH TECHNICA Co. Ltd.). The particles resulting from the granulation of the manganese compound and the silica have a diameter of, for example, about not less than 1 mm and not more than 5 mm. However, the particle diameter is not limited thereto and may be different from the above diameters.

Figure 2:
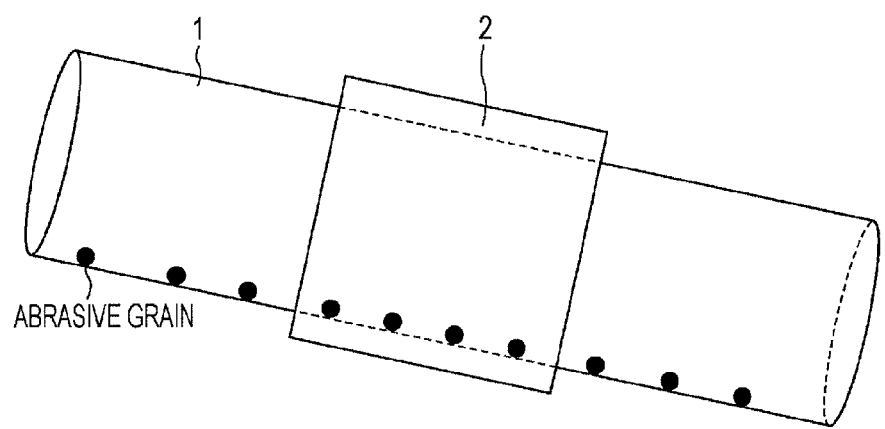
FIG. 2 illustrates a rotary kiln as an example of a firing furnace.

FIG. 2 illustrates a rotary kiln as an example of the firing furnace. The rotary kiln illustrated in FIG. 2 has a cylindrical quartz tube 1 and an electric furnace 2 covering the quartz tube 1. The quartz tube 1 is inclined and is rotatable. The electric furnace 2 is provided in the vicinity of the center of the quartz tube 1. The granules of the manganese compound and the silica are introduced into the quartz tube 1, and the quartz tube 1 is heated by the electric furnace 2 while the quartz tube 1 is rotated. In this manner, the manganese compound and the silica are heat-treated. The quartz tube 1 is about 100 mm in diameter and about 2000 mm in length.

The temperature of the manganese compound and the silica introduced into the quartz tube 1 is rapidly increased by the heat from the quartz tube 1. When the manganese compound and the silica are discharged from the quartz tube 1, the temperature of the manganese compound and the silica is rapidly lowered by the exposure to the atmosphere. That is, the heat-treatment using a rotary kiln rapidly heats and then rapidly cools the manganese compound and the silica. In other words, the heat-treatment with a rotary kiln performs rapid heating and rapid cooling of the manganese compound and the silica.

Adjusting the angle of inclination of the quartz tube 1 allows for controlling of the tumbling speed of the particles and thus controlling of the heat-treatment time for the manganese compound and the silica. The reason why the manganese compound and the silica are granulated prior to the rotary kiln heat-treatment is because the granulated manganese compound and silica will not build up within the quartz tube 1.

Next, the heat-treated manganese compound and silica are milled in the step S3 in FIG. 1, thereby forming abrasive gains including the manganese compound and the silica. For example, the heat-treated manganese compound and silica are milled with a jet mill and thereafter finely milled with a bead mill. A jet mill causes particles to collide with each other using high pressure air or vapor and thereby pulverizes the particles into smaller sizes. A bead mill pulverizes an object in a cylinder packed with beads. In detail, a stirrer is rotated in the cylinder so as to fluidize the beads and the object, thereby grinding the object with the beads. In the case of a jet mill, for example, the manganese compound and the silica are subjected to milling one time. In the case of a bead mill, for example, milling is performed one to ten times. However, the number of cycles of jet milling and that of bead milling are not limited thereto and may be different from the above numbers of cycles. For example, each cycle of bead milling may be carried out for 30 minutes.

Next, in the step S4 in FIG. 1, an abrasive agent (a slurry) is produced by adding pure water as a solvent to the abrasive grains including the manganese compound and the silica. In this case, the pure water is added such that the solid concentration of the abrasive grains including the manganese compound and the silica becomes about 10 wt %. However, the pure water may be added such that the solid concentration of the abrasive grains including the manganese compound and the silica becomes a value below or above 10 wt %. In the step S4 in FIG. 1, potassium hydroxide (KOH) or nitric acid (HNO$_3$) may be added in combination with the pure water to the abrasive grains including the manganese compound and the silica.

An abrasive agent produced by the abrasive agent production method according to this embodiment achieves a higher polishing rate than an abrasive agent containing a manganese compound to which no silica has been added. Further, the polishing rate of an abrasive agent produced by the abrasive agent production method according to this embodiment is higher than that of an abrasive agent prepared by adding a silica to a manganese compound after the manganese compound is heat-treated.

If the number of cycles in which the manganese compound and the silica are milled is small (if the milling time is short), the manganese compound and the silica have larger particle diameters to cause marked sedimentation of the particles of the manganese compound and the silica in the abrasive agent. Thus, the manganese compound and the silica are milled with an increased number of milling cycles (for a longer milling time) to reduce the particle diameters of the manganese compound and the silica. However, increasing the number of cycles in which the manganese compound and the silica are milled (the milling time) results in an increase in the abrasive agent production time. Thus, it is preferable that an appropriate number of milling cycles (an appropriate milling time) be selected in accordance with the manganese compound and the silica.

In the case where the polishing rate is varied depending on the number of cycles in which the manganese compound and the silica are milled, it is preferable that an appropriate number of milling cycles (an appropriate milling time) be selected in accordance with the manganese compound and the silica. The following experiments studied relationships between the polishing rate of abrasive agents and the number of cycles in which a manganese compound and a silica were milled. Such relationships between the polishing rate of abrasive agents and the number of cycles of milling of a manganese compound and a silica are discussed with reference to FIGS. 3A to 12.

FIGS. 3A and 3B illustrate experimental conditions, and FIGS. 4 to 12 illustrate experimental results. The experimental conditions in FIGS. 3A and 3B are: (A) a silica was added before the heat-treatment; (B) a silica was added after the heat-treatment; and (C) a silica was not added.

The experimental conditions (A-1) to (A-5) in FIG. 3A, and the experimental conditions (A-6) to (A-9) in FIG. 3B represent conditions under which a manganese compound to which a silica had been added was heat-treated. The experimental conditions (A-1) to (A-5) in FIG. 3A, and the experimental conditions (A-6) to (A-9) in FIG. 3B represent conditions under which an abrasive agent was prepared by the abrasive agent production method according to this embodiment. The experimental conditions (B-1) to (B-5) in FIG. 3A, and the experimental conditions (B-6) to (B-9) in FIG. 3B represent conditions under which a silica was added after a manganese compound was heat-treated. The experimental conditions (C-1) to (C-5) in FIG. 3A, and the experimental conditions (C-6) to (C-9) in FIG. 3B represent conditions under which a manganese compound was heat-treated but a silica was not added afterward. The experimental conditions (B-1) to (B-9) and (C-1) to (C-9) in FIGS. 3A and 3B represent comparative embodiments of abrasive agent production.

"STARTING MATERIAL" in FIGS. 3A and 3B represents types of manganese compounds. "HEAT-TREATMENT FURNACE" in FIGS. 3A and 3B represents types of heat-treatment furnaces used in the heat-treatment. "TREATMENT TEMP. (° C.)" in FIGS. 3A and 3B represents temperatures in the heat-treatment. "ADDITION OF SILICA" in FIGS. 3A and 3B represents whether a manganese compound to which a silica had been added was heat-treated (BEFORE HEAT-TREATMENT), a silica was added after a manganese compound was heat-treated (AFTER HEAT-TREATMENT), or a silica was not added after a manganese compound was heat-treated (NOT ADDED). The silica was added to the manganese compound such that the concentration of the silica relative to the manganese compound became 3 wt %. "NUMBER OF MILLING CYCLES" in FIGS. 3A and 3B represents numbers of cycles of milling with a bead mill. The number of cycles of milling with a jet mill is one time. "EXPERIMENTAL RESULTS (FIG.)" in FIGS. 3A and 3B represents figures which illustrate the experimental results obtained under the respective experimental conditions.

A colloidal silica was used as the silica to be added to the manganese compound. The colloidal silica used was SNOWTEX O (manufactured by NISSAN CHEMICAL INDUSTRIES, LTD.) or COMPOL 80 (manufactured by FUJIMI INCORPORATED). A pilot device was used as the rotary kiln, or FO300 manufactured by YAMATO SCIENTIFIC CO., LTD. was used as the muffle furnace. As the bead mill, DYNO-MILL KDL-PILOT (manufactured by Shinmaru Enterprise Corporation) was used. Zirconia ($ZrO_2$) beads having a particle diameter of about 1.0 mm were loaded into a cylinder at 80 vol %, and the manganese compound and the silica were milled with the bead mill. The milling time of each cycle of bead milling was set to be 30 minutes.

FIGS. 4 to 12 illustrate results of experiments in which a thermally oxidized film ($SiO_2$) with a thickness of about 1 μm formed by oxidizing a silicon wafer with vapor was polished under the following conditions:

Polishing pad: IC1400 (manufactured by Nitta Haas Incorporated)

Polishing pressure: 0.3 kg/cm$^2$

Rotational speeds: 45 rpm (upper platen), 46 rpm (lower platen)

Platen diameter: 400 mm

Figure 4:
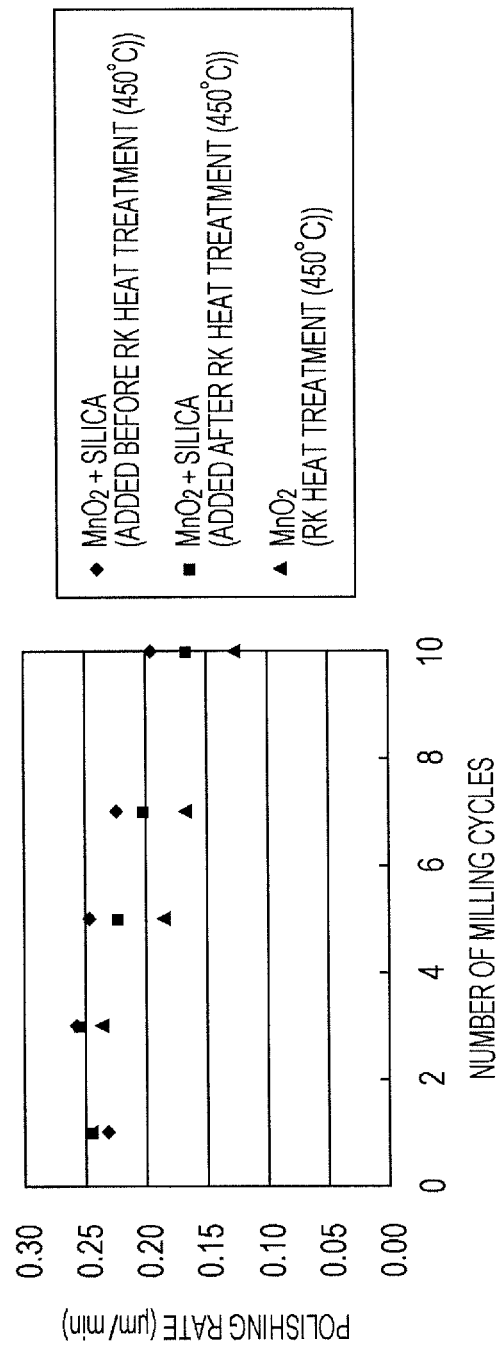
FIG. 4 illustrates experimental results obtained when $MnO_2$ was treated by a rotary kiln (RK) heat-treatment at 450° C. using a rotary kiln.

The experimental results illustrated in FIGS. 4 to 7 will be described in detail. FIG. 4 illustrates experimental results obtained when $MnO_2$ was treated by a rotary kiln (RK) heat-treatment at 450° C. using the rotary kiln. In FIG. 4, the diamonds represent values of polishing rates (μm/min) of abrasive agents prepared by heat-treating $MnO_2$ to which the silica had been added. In FIG. 4, the squares represent values of polishing rates (μm/min) of abrasive agents prepared by heat-treating $MnO_2$ and thereafter adding the silica to $MnO_2$. In FIG. 4, the triangles represent values of polishing rates (μm/min) of abrasive agents prepared by heat-treating $MnO_2$ without the addition of the silica to the heat-treated $MnO_2$. Further, the dependence of the polishing rate on the number of cycles of bead milling is evaluated. That is, FIG. 4 illustrates variations of values of polishing rates (μm/min) of the abrasive agents in accordance with the number of cycles of bead milling (1, 3, 5, 7 or 10 cycles).

As illustrated in FIG. 4, the abrasive agents produced by the rotary kiln heat-treatment for $MnO_2$ at 450° C. exhibit a lower polishing rate with increasing number of milling cycles. FIG. 4 further illustrates that the addition of the silica to $MnO_2$ increases the polishing rate of the abrasive agent compared to when the silica was not added to $MnO_2$. Furthermore, as illustrated in FIG. 4, the decrease in the polishing rate of the abrasive agents due to an increased number of milling cycles became smaller when the abrasive agents had been produced in such a manner that $MnO_2$ to which the silica had been added was heat-treated. That is, the decrease in the polishing rate of the abrasive agents due to an increased number of milling cycles became smaller when the silica had been added to $MnO_2$ before the heat-treatment of $MnO_2$ compared to when the silica had been added after the heat-treatment or when the silica had not been added.

Figure 5:
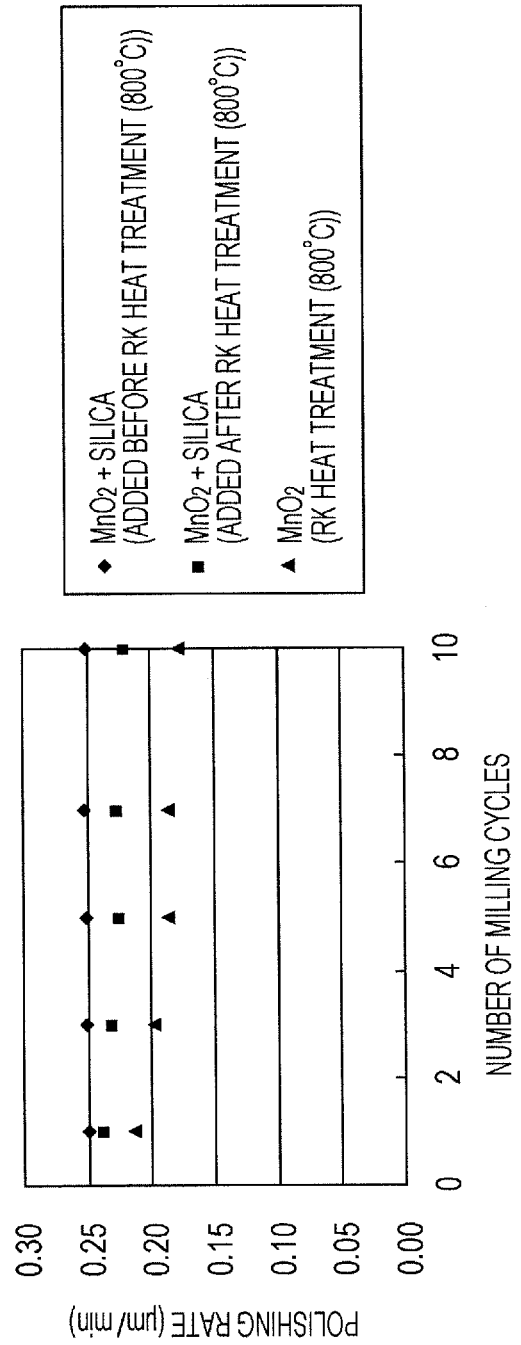
FIG. 5 illustrates experimental results obtained when $MnO_2$ was treated by a rotary kiln (RK) heat-treatment at 800° C. using a rotary kiln.

FIG. 5 illustrates experimental results obtained when $MnO_2$ was treated by a rotary kiln (RK) heat-treatment at 800° C. using the rotary kiln. In FIG. 5, the diamonds represent values of polishing rates (μm/min) of abrasive agents prepared by heat-treating $MnO_2$ to which the silica had been added. In FIG. 5, the squares represent values of polishing rates (μm/min) of abrasive agents prepared by heat-treating $MnO_2$ and thereafter adding the silica to $MnO_2$. In FIG. 5, the triangles represent values of polishing rates (μm/min) of abrasive agents prepared by heat-treating $MnO_2$ without the addition of the silica to the heat-treated $MnO_2$. Further, the dependence of the polishing rate on the number of cycles of bead milling is evaluated. That is, FIG. 5 illustrates variations of values of polishing rates (μm/min) of the abrasive agents in accordance with the number of cycles of bead milling (1, 3, 5, 7 or 10 cycles).

As illustrated in FIG. 5, the addition of the silica to $MnO_2$ increases the polishing rate of the abrasive agent compared to when the silica was not added to $MnO_2$. Further, as illustrated in FIG. 5, the decrease in the polishing rate of the abrasive agents due to an increased number of milling cycles became smaller when the abrasive agents had been produced in such a manner that $MnO_2$ to which the silica had been added was heat-treated. That is, the decrease in the polishing rate of the abrasive agents due to an increased number of milling cycles became smaller when the silica had been added to $MnO_2$ before the heat-treatment of $MnO_2$ compared to when the silica had been added after the heat-treatment or when the silica had not been added.

Figure 6:
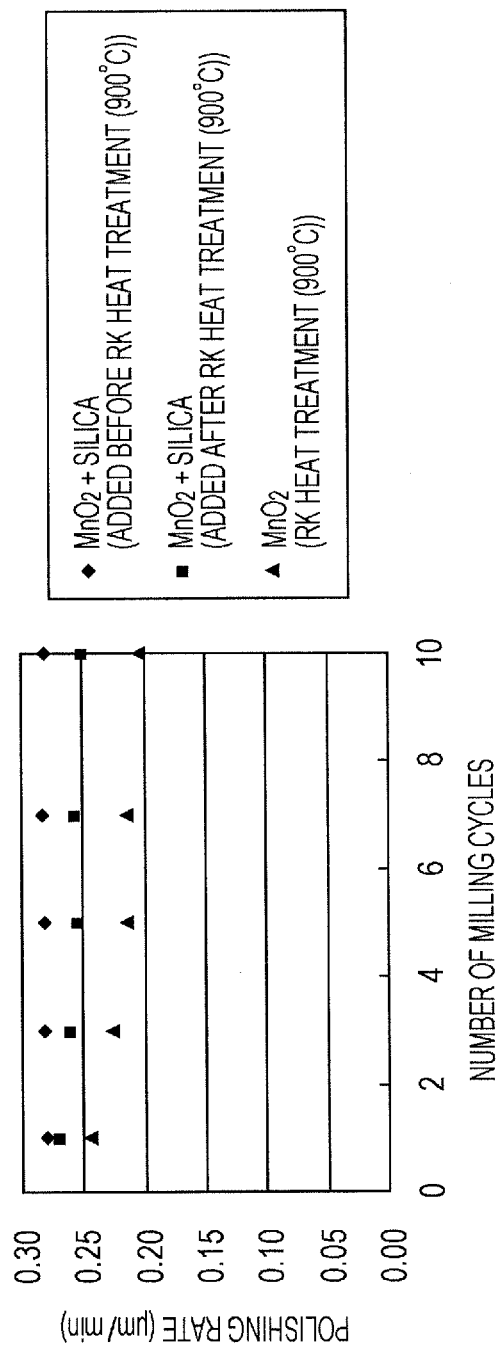
FIG. 6 illustrates experimental results obtained when $MnO_2$ was treated by a rotary kiln (RK) heat-treatment at 900° C. using a rotary kiln.

FIG. 6 illustrates experimental results obtained when $MnO_2$ was treated by a rotary kiln (RK) heat-treatment at 900° C. using the rotary kiln. In FIG. 6, the diamonds represent values of polishing rates (μm/min) of abrasive agents prepared by heat-treating $MnO_2$ to which the silica had been added. In FIG. 6, the squares represent values of polishing rates (μm/min) of abrasive agents prepared by heat-treating $MnO_2$ and thereafter adding the silica to $MnO_2$. In FIG. 6, the triangles represent values of polishing rates (μm/min) of abrasive agents prepared by heat-treating $MnO_2$ without the addition of the silica to the heat-treated $MnO_2$. Further, the dependence of the polishing rate on the number of cycles of bead milling is evaluated. That is, FIG. 6 illustrates variations of values of polishing rates (μm/min) of the abrasive agents in accordance with the number of cycles of bead milling (1, 3, 5, 7 or 10 cycles).

As illustrated in FIG. 6, the addition of the silica to $MnO_2$ increases the polishing rate of the abrasive agent compared to when the silica was not added to $MnO_2$. Further, as illustrated in FIG. 6, the decrease in the polishing rate of the abrasive agents due to an increased number of milling cycles became smaller when the abrasive agents had been produced in such a manner that $MnO_2$ to which the silica had been added was heat-treated. That is, the decrease in the polishing rate of the abrasive agents due to an increased number of milling cycles became smaller when the silica had been added to $MnO_2$ before the heat-treatment of $MnO_2$ compared to when the silica had been added after the heat-treatment or when the silica had not been added.

Figure 7:
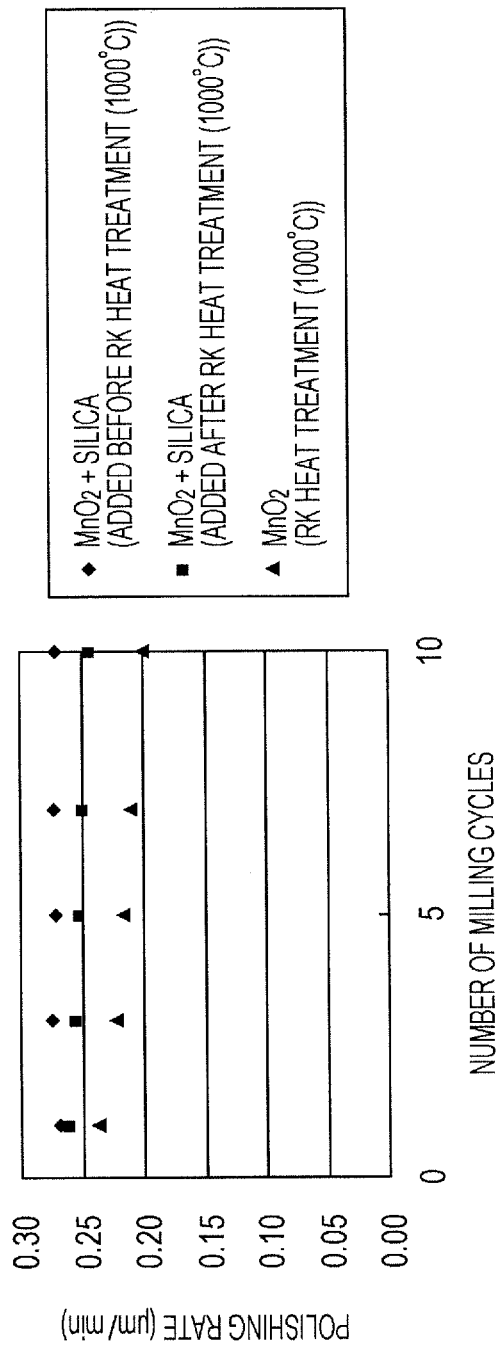
FIG. 7 illustrates experimental results obtained when $MnO_2$ was treated by a rotary kiln (RK) heat-treatment at 1000° C. using a rotary kiln.

FIG. 7 illustrates experimental results obtained when $MnO_2$ was treated by a rotary kiln (RK) heat-treatment at 1000° C. using the rotary kiln. In FIG. 7, the diamonds represent values of polishing rates (μm/min) of abrasive agents prepared by heat-treating $MnO_2$ to which the silica had been added. In FIG. 7, the squares represent values of polishing rates (μm/min) of abrasive agents prepared by heat-treating $MnO_2$ and thereafter adding the silica to $MnO_2$. In FIG. 7, the triangles represent values of polishing rates (μm/min) of abrasive agents prepared by heat-treating $MnO_2$ without the addition of the silica to the heat-treated $MnO_2$. Further, the dependence of the polishing rate on the number of cycles of bead milling is evaluated. That is, FIG. 7 illustrates variations of values of polishing rates (μm/min) of the abrasive agents in accordance with the number of cycles of bead milling (1, 3, 5, 7 or 10 cycles).

As illustrated in FIG. 7, the addition of the silica to $MnO_2$ increases the polishing rate of the abrasive agent compared to when the silica was not added to $MnO_2$. Further, as illustrated in FIG. 7, the decrease in the polishing rate of the abrasive agents due to an increased number of milling cycles became smaller when the abrasive agents had been produced in such a manner that $MnO_2$ to which the silica had been added was heat-treated. That is, the decrease in the polishing rate of the abrasive agents due to an increased number of milling cycles became smaller when the silica had been added to $MnO_2$ before the heat-treatment of $MnO_2$ compared to when the silica had been added after the heat-treatment or when the silica had not been added.

From the experimental results in FIGS. 4 to 7, the abrasive agents exhibited the highest polishing rate when $MnO_2$ was heat-treated at a temperature in the vicinity of 900° C. with the rotary kiln. Further, the experimental results in FIGS. 4 to 7 illustrate that the polishing rates of the abrasive agents were increased when the silica had been added to $MnO_2$ before the heat-treatment of $MnO_2$ in the rotary kiln compared to when the silica had been added after the heat-treatment or when the silica had not been added. Furthermore, the experimental results in FIGS. 4 to 7 illustrate that the decrease in the polishing rate of the abrasive agents due to an increased number of cycles of milling of $MnO_2$ and the silica became smaller when the silica had been added to $MnO_2$ before the heat-treatment of $MnO_2$ compared to when the silica had been added after the heat-treatment or when the silica had not been added.

Figure 8:
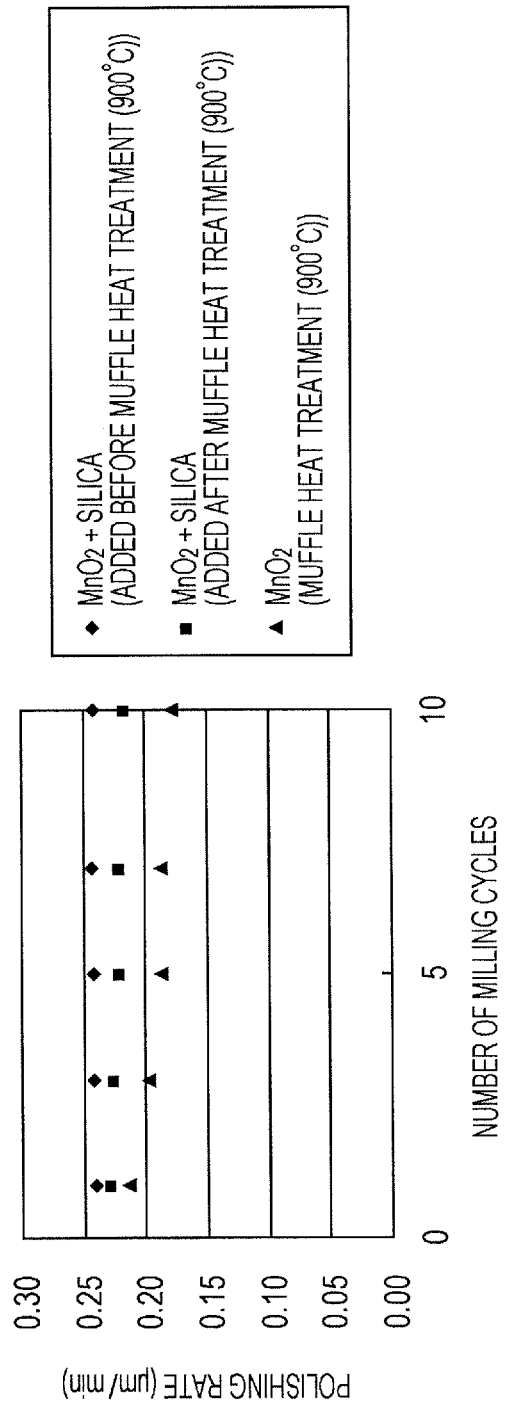
FIG. 8 illustrates experimental results obtained when $MnO_2$ was treated by a muffle heat-treatment at 900° C. using a muffle furnace.

The experimental results illustrated in FIGS. 8 to 12 will be described in detail. FIG. 8 illustrates experimental results obtained when $MnO_2$ was treated by a muffle heat-treatment at 900° C. using the muffle furnace. In FIG. 8, the diamonds represent values of polishing rates (μm/min) of abrasive agents prepared by heat-treating $MnO_2$ to which the silica had been added. In FIG. 8, the squares represent values of polishing rates (μm/min) of abrasive agents prepared by heat-treating $MnO_2$ and thereafter adding the silica to $MnO_2$. In FIG. 8, the triangles represent values of polishing rates (μm/min) of abrasive agents prepared by heat-treating $MnO_2$ without the addition of the silica to the heat-treated $MnO_2$. Further, the dependence of the polishing rate on the number of cycles of bead milling is evaluated. That is, FIG. 8 illustrates variations of values of polishing rates (μm/min) of the abrasive agents in accordance with the number of cycles of bead milling (1, 3, 5, 7 or 10 cycles).

As illustrated in FIG. 8, the addition of the silica to $MnO_2$ increases the polishing rate of the abrasive agent compared to when the silica was not added to $MnO_2$. Further, as illustrated in FIG. 8, the decrease in the polishing rate of the abrasive agents due to an increased number of milling cycles became smaller when the abrasive agents had been produced in such a manner that $MnO_2$ to which the silica had been added was heat-treated. That is, the decrease in the polishing rate of the abrasive agents due to an increased number of milling cycles became smaller when the silica had been added to $MnO_2$ before the heat-treatment of $MnO_2$ compared to when the silica had been added after the heat-treatment or when the silica had not been added.

From the comparison between FIG. 7 and FIG. 8, the polishing rate of the abrasive agent was higher when $MnO_2$ to which the silica had been added was heat-treated with the rotary kiln compared to when $MnO_2$ to which the silica had been added was heat-treated with the muffle furnace. The reason for this result is probably because the heat-treatment with the rotary kiln was such a type of treatment that rapidly heated and thereafter rapidly cooled $MnO_2$ to which the silica had been added, and consequently the abrasive agent prepared through the heat-treatment with the rotary kiln achieved a higher polishing rate.

Figure 9:
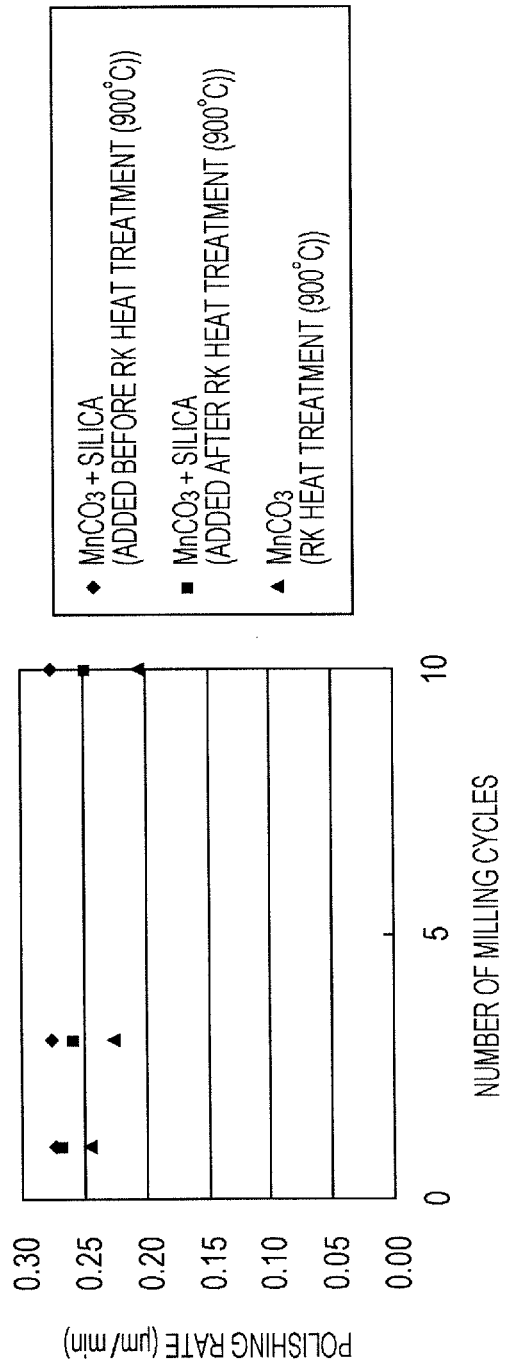
FIG. 9 illustrates experimental results obtained when $MnCO_3$ was treated by a rotary kiln (RK) heat-treatment at 900° C. using a rotary kiln.

FIG. 9 illustrates experimental results obtained when $MnCO_3$ was treated by a rotary kiln (RK) heat-treatment at 900° C. using the rotary kiln. In FIG. 9, the diamonds represent values of polishing rates (μm/min) of abrasive agents prepared by heat-treating $MnCO_3$ to which the silica had been added. In FIG. 9, the squares represent values of polishing rates (μm/min) of abrasive agents prepared by heat-treating $MnCO_3$ and thereafter adding the silica to $MnCO_3$. In FIG. 9, the triangles represent values of polishing rates (μm/min) of abrasive agents prepared by heat-treating $MnCO_3$ without the addition of the silica to the heat-treated $MnCO_3$. Further, the dependence of the polishing rate on the number of cycles of bead milling is evaluated. That is, FIG. 9 illustrates variations of values of polishing rates (μm/min) of the abrasive agents in accordance with the number of cycles of bead milling (1, 3 or 10 cycles).

As illustrated in FIG. 9, the addition of the silica to $MnCO_3$ increases the polishing rate of the abrasive agent compared to when the silica was not added to $MnCO_3$. Further, as illustrated in FIG. 9, the decrease in the polishing rate of the abrasive agents due to an increased number of milling cycles became smaller when the abrasive agents had been produced in such a manner that $MnCO_3$ to which the silica had been added was heat-treated. That is, the decrease in the polishing rate of the abrasive agents due to an increased number of milling cycles became smaller when the silica had been added to $MnCO_3$ before the heat-treatment of $MnCO_3$ compared to when the silica had been added after the heat-treatment or when the silica had not been added.

Figure 10:
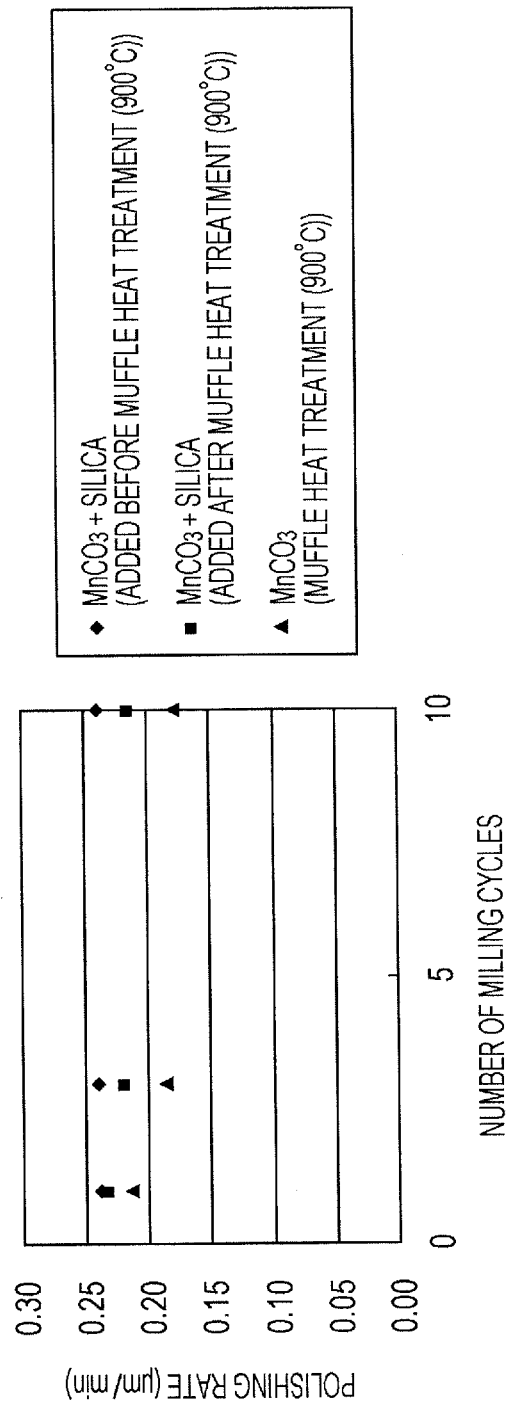
FIG. 10 illustrates experimental results obtained when $MnCO_3$ was treated by a muffle heat-treatment at 900° C. using a muffle furnace.

FIG. 10 illustrates experimental results obtained when $MnCO_3$ was treated by a muffle heat-treatment at 900° C. using the muffle furnace. In FIG. 10, the diamonds represent values of polishing rates (μm/min) of abrasive agents prepared by heat-treating $MnCO_3$ to which the silica had been added. In FIG. 10, the squares represent values of polishing rates (μm/min) of abrasive agents prepared by heat-treating $MnCO_3$ and thereafter adding the silica to $MnCO_3$. In FIG. 10, the triangles represent values of polishing rates (μm/min) of abrasive agents prepared by heat-treating $MnCO_3$ without the addition of the silica to the heat-treated $MnCO_3$. Further, the dependence of the polishing rate on the number of cycles of bead milling is evaluated. That is, FIG. 10 illustrates variations of values of polishing rates (μm/min) of the abrasive agents in accordance with the number of cycles of bead milling (1, 3 or 10 cycles).

As illustrated in FIG. 10, the addition of the silica to $MnCO_3$ increases the polishing rate of the abrasive agent compared to when the silica was not added to $MnCO_3$. Further, as illustrated in FIG. 10, the decrease in the polishing rate of the abrasive agents due to an increased number of milling cycles became smaller when the abrasive agents had been produced in such a manner that $MnCO_3$ to which the silica had been added was heat-treated. That is, the decrease in the polishing rate of the abrasive agents due to an increased number of milling cycles became smaller when the silica had been added to $MnCO_3$ before the heat-treatment of $MnCO_3$ compared to when the silica had been added after the heat-treatment or when the silica had not been added.

From the comparison between FIG. 9 and FIG. 10, the polishing rate of the abrasive agent was higher when $MnCO_3$ to which the silica had been added was heat-treated with the rotary kiln compared to when $MnCO_3$ to which the silica had been added was heat-treated with the muffle furnace. The reason for this result is probably because the heat-treatment with the rotary kiln was such a type of treatment that rapidly heated and thereafter rapidly cooled $MnCO_3$ to which the silica had been added, and consequently the abrasive agent prepared through the heat-treatment with the rotary kiln achieved a higher polishing rate.

Figure 11:
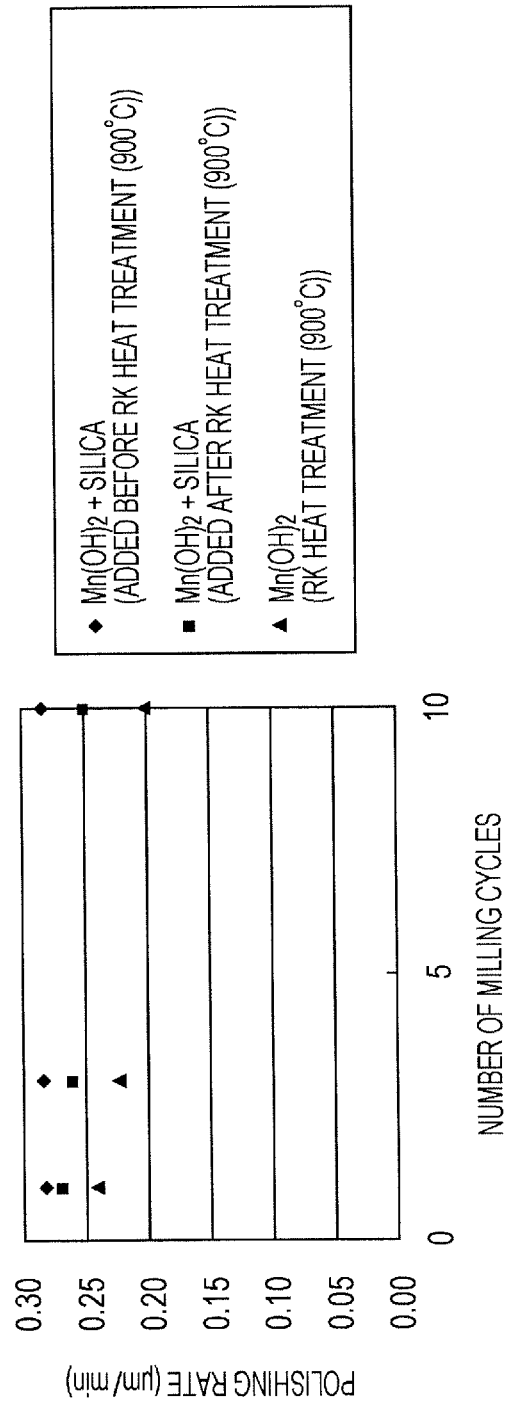
FIG. 11 illustrates experimental results obtained when $Mn(OH)_2$ was treated by a rotary kiln (RK) heat-treatment at 900° C. using a rotary kiln.

FIG. 11 illustrates experimental results obtained when $Mn(OH)_2$ was treated by a rotary kiln (RK) heat-treatment at 900° C. using the rotary kiln. In FIG. 11, the diamonds represent values of polishing rates (μm/min) of abrasive agents prepared by heat-treating $Mn(OH)_2$ to which the silica had been added. In FIG. 11, the squares represent values of polishing rates (n/min) of abrasive agents prepared by heat-treating $Mn(OH)_2$ and thereafter adding the silica to $Mn(OH)_2$. In FIG. 11, the triangles represent values of polishing rates (μm/min) of abrasive agents prepared by heat-treating $Mn(OH)_2$ without the addition of the silica to the heat-treated $Mn(OH)_2$. Further, the dependence of the polishing rate on the number of cycles of bead milling is evaluated. That is, FIG. 11 illustrates variations of values of polishing rates (μm/min) of the abrasive agents in accordance with the number of cycles of bead milling (1, 3 or 10 cycles).

As illustrated in FIG. 11, the addition of the silica to $Mn(OH)_2$ increases the polishing rate of the abrasive agent compared to when the silica was not added to $Mn(OH)_2$. Further, as illustrated in FIG. 11, the decrease in the polishing rate of the abrasive agents due to an increased number of milling cycles became smaller when the abrasive agents had been produced in such a manner that $Mn(OH)_2$ to which the silica had been added was heat-treated. That is, the decrease in the polishing rate of the abrasive agents due to an increased number of milling cycles became smaller when the silica had been added to $Mn(OH)_2$ before the heat-treatment of $Mn(OH)_2$ compared to when the silica had been added after the heat-treatment or when the silica had not been added.

Figure 12:
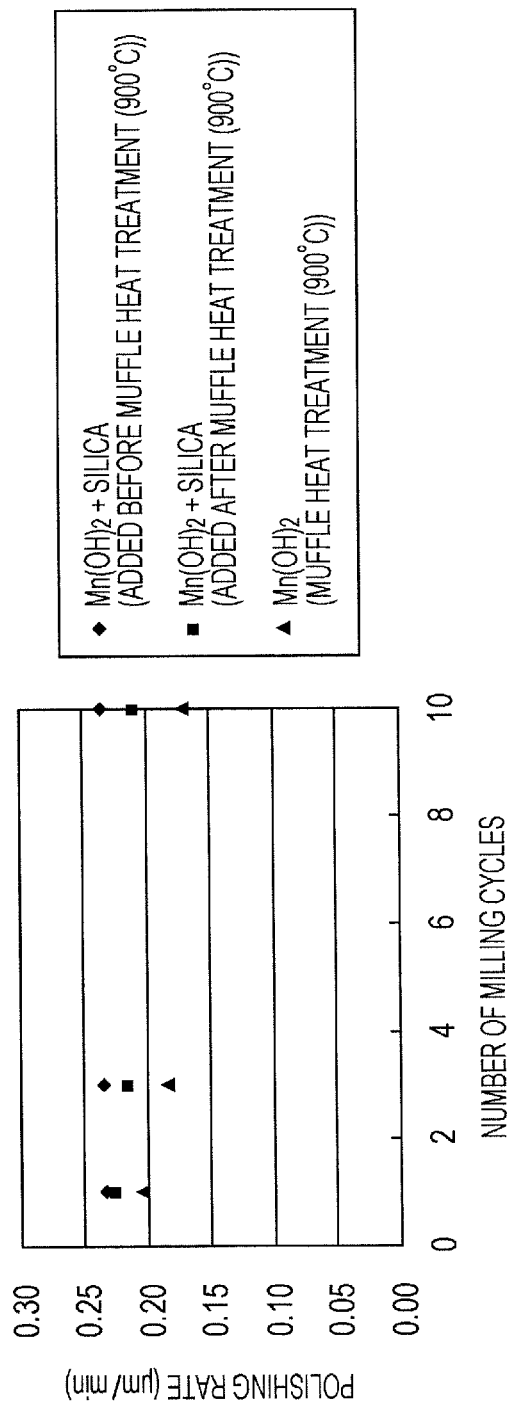
FIG. 12 illustrates experimental results obtained when $Mn(OH)_2$ was treated by a muffle heat-treatment at 900° C. using a muffle furnace.

FIG. 12 illustrates experimental results obtained when $Mn(OH)_2$ was treated by a muffle heat-treatment at 900° C. using the muffle furnace. In FIG. 12, the diamonds represent values of polishing rates (μm/min) of abrasive agents prepared by heat-treating $Mn(OH)_2$ to which the silica had been added. In FIG. 12, the squares represent values of polishing rates (μm/min) of abrasive agents prepared by heat-treating $Mn(OH)_2$ and thereafter adding the silica to $Mn(OH)_2$. In FIG. 12, the triangles represent values of polishing rates (μm/min) of abrasive agents prepared by heat-treating $Mn(OH)_2$ without the addition of the silica to the heat-treated $Mn(OH)_2$. Further, the dependence of the polishing rate on the number of cycles of bead milling is evaluated. That is, FIG. 12 illustrates variations of values of polishing rates (μm/min) of the abrasive agents in accordance with the number of cycles of bead milling (1, 3 or 10 cycles).

As illustrated in FIG. 12, the addition of the silica to $Mn(OH)_2$ increases the polishing rate of the abrasive agent compared to when the silica was not added to $Mn(OH)_2$. Further, as illustrated in FIG. 12, the decrease in the polishing rate of the abrasive agents due to an increased number of milling cycles became smaller when the abrasive agents had been produced in such a manner that $Mn(OH)_2$ to which the silica had been added was heat-treated. That is, the decrease in the polishing rate of the abrasive agents due to an increased number of milling cycles became smaller when the silica had been added to $Mn(OH)_2$ before the heat-treatment of $Mn(OH)_2$ compared to when the silica had been added after the heat-treatment or when the silica had not been added.

From the comparison between FIG. 11 and FIG. 12, the polishing rate of the abrasive agent was higher when $Mn(OH)_2$ to which the silica had been added was heat-treated with the rotary kiln compared to when $Mn(OH)_2$ to which the silica had been added was heat-treated with the muffle furnace. The reason for this result is probably because the heat-treatment with the rotary kiln was such a type of treatment that rapidly heated and thereafter rapidly cooled $Mn(OH)_2$ to which the silica had been added, and consequently the abrasive agent prepared through the heat-treatment with the rotary kiln achieved a higher polishing rate.

From the experimental results in FIGS. 6 and 8 to 12, it may be said that the abrasive agents prepared from $MnCO_3$ or $Mn(OH)_2$ as a starting material tend to exhibit a similar polishing rate to the abrasive agents prepared from $MnO_2$ as a starting material. The addition of the silica to $MnCO_3$ before the heat-treatment of $MnCO_3$ increases the polishing rate of the abrasive agent compared to when the silica is added after the heat-treatment or when the silica is not added. The addition of the silica to $Mn(OH)_2$ before the heat-treatment of $Mn(OH)_2$ increases the polishing rate of the abrasive agent compared to when the silica is added after the heat-treatment or when the silica is not added. The decrease in the polishing rate of the abrasive agents due to an increased number of milling cycles becomes smaller when the silica is added to $MnCO_3$ before the heat-treatment of $MnCO_3$ compared to when the silica is added after the heat-treatment or when the silica is not added. The decrease in the polishing rate of the abrasive agents due to an increased number of milling cycles becomes smaller when the silica is added to $Mn(OH)_2$ before the heat-treatment of $Mn(OH)_2$ compared to when the silica is added after the heat-treatment or when the silica is not added.

From the experimental results in FIGS. 6 and 8 to 12, it is apparent that the polishing rate of the abrasive grains was increased by about 0.04 to 0.05 μm/min when the heat-treatment was performed with the rotary kiln compared to when the heat-treatment was carried out with the muffle furnace.

The polishing rate of commercial abrasive agents containing cerium oxide ($CeO_2$) is 0.25 to 0.30 μm/min. The abrasive agents produced according to this embodiment by adding the silica to the manganese compound and thereafter heat-treating the manganese compound to which the silica has been added exhibit a polishing rate comparable to that of the abrasive grains containing cerium oxide ($CeO_2$).

A plurality of experiments were carried out while adding the silica at a concentration of not less than 2 wt % and not more than 10 wt % relative to the manganese compound, resulting in similar results to the experimental results illustrated in FIGS. 4 to 12. Thus, it has been demonstrated that the decrease in the polishing rate of the abrasive agents due to an increased number of milling cycles becomes smaller and the polishing rate of the abrasive agents is improved also in the case where the silica is added to the manganese compound in such an amount that the concentration of the silica becomes not less than 2 wt % and not more than 10 wt % relative to the manganese compound.

Heat-treating $MnO_2$ around a temperature of not less than 650° C. and not more than 900° C. converts $MnO_2$ into $Mn_2O_3$. When $MnO_2$ is heat-treated around a temperature of not less than 1000° C., $MnO_2$ forms a mixed compound of $Mn_2O_3$ and $Mn_3O_4$. It is considered that when $MnO_2$ to which a silica has been added is heat-treated around a temperature of not less than 650° C. and not more than 900° C., part of the silica and part of $Mn_2O_3$ react with each other during the heat-treatment to form a manganese silicon oxide ($Mn_xSi_yO_z$). It is also considered that when $MnO_2$ to which a silica has been added is heat-treated around a temperature of 1000° C., part of the silica reacts with part of $Mn_2O_3$ and part of $Mn_3O_4$ during the heat-treatment to form a manganese silicon oxide ($Mn_xSi_yO_z$). Thus, an abrasive agent produced by heat-treating $MnO_2$ to which a silica has been added around a temperature of not less than 650° C. and not more than 1000° C. includes a manganese silicon oxide ($Mn_xSi_yO_z$). From the experimental results illustrated in FIGS. 4 to 8, the abrasive agents which have abrasive grains including the silica, $MnO_2$ and a manganese silicon oxide ($Mn_xSi_yO_z$) have a small decrease in the polishing rate of the abrasive agents due to an increased number of milling cycles, and exhibit an improved polishing rate.

Heat-treating $MnCO_3$ around a temperature of not less than 650° C. and not more than 900° C. converts $MnCO_3$ into $Mn_2O_3$. When $MnCO_3$ is heat-treated around a temperature of not less than 1000° C., $MnCO_3$ forms a mixed compound of $Mn_2O_3$ and $Mn_3O_4$. It is considered that when $MnCO_3$ to which a silica has been added is heat-treated around a temperature of not less than 650° C. and not more than 900° C., part of the silica and part of $Mn_2O_3$ react with each other during the heat-treatment to form a manganese silicon oxide ($Mn_xSi_yO_z$). It is also considered that when $MnCO_3$ to which a silica has been added is heat-treated around a temperature of 1000° C., part of the silica reacts with part of $Mn_2O_3$ and part of $Mn_3O_4$ during the heat-treatment to form a manganese silicon oxide ($Mn_xSi_yO_z$). Thus, an abrasive agent produced by heat-treating $MnCO_3$ to which a silica has been added around a temperature of not less than 650° C. and not more than 1000° C. includes a manganese silicon oxide ($Mn_xSi_yO_z$). From the experimental results illustrated in FIGS. 9 and 10, the abrasive agents which have abrasive grains including the silica, $MnCO_3$ and a manganese silicon oxide ($Mn_xSi_yO_z$) have a small decrease in the polishing rate of the abrasive agents due to an increased number of milling cycles, and exhibit an improved polishing rate.

Heat-treating $Mn(OH)_2$ around a temperature of not less than 650° C. and not more than 900° C. converts $Mn(OH)_2$ into $Mn_2O_3$. When $Mn(OH)_2$ is heat-treated around a temperature of not less than 1000° C., $Mn(OH)_2$ forms a mixed compound of $Mn_2O_3$ and $Mn_3O_4$. It is considered that when $Mn(OH)_2$ to which a silica has been added is heat-treated around a temperature of not less than 650° C. and not more than 900° C., part of the silica and part of $Mn_2O_3$ react with each other during the heat-treatment to form a manganese silicon oxide ($Mn_xSi_yO_z$). It is also considered that when $Mn(OH)_2$ to which a silica has been added is heat-treated around a temperature of 1000° C., part of the silica reacts with part of $Mn_2O_3$ and part of $Mn_3O_4$ during the heat-treatment to form a manganese silicon oxide ($Mn_xSi_yO_z$). Thus, an abrasive agent produced by heat-treating $Mn(OH)_2$ to which a silica has been added around a temperature of not less than 650° C. and not more than 1000° C. includes a manganese silicon oxide ($Mn_xSi_yO_z$). From the experimental results illustrated in FIGS. 11 and 12, the abrasive agents which have abrasive grains including the silica, $Mn(OH)_2$ and a manganese silicon oxide ($Mn_xSi_yO_z$) have a small decrease in the polishing rate of the abrasive agents due to an increased number of milling cycles, and exhibit an improved polishing rate.

An abrasive agent produced by the method for producing abrasive agents according to this embodiment may be used to polish, for example, flat glass plates used in electronic devices such as PDP (plasma display panels) and LCD (liquid crystal displays). Flat glass plates are an example of glass substrates. Alternatively, an abrasive agent produced by the method for producing abrasive agents according to this embodiment may be used to polish, for example, flat glass plates used in electronic devices such as smartphones, PDA (personal digital assistants), tablet terminals, cell-phones and game machines. Still alternatively, an abrasive agent produced by the method for producing abrasive agents according to this embodiment may be used to polish, for example, glass substrates of hard disks in electronic devices such as PC (personal computers). Still further alternatively, an abrasive agent produced by the method for producing abrasive agents according to this embodiment may be used in polishing such as CMP (chemical mechanical polishing) in semiconductor manufacturing processes.

Method for Polishing Flat Glass Plates

There will be described an exemplary method for polishing a flat glass plate using an abrasive agent produced by the method for producing abrasive agents according to this embodiment. For example, a polishing machine equipped with a jig that holds the flat glass plate, and the polishing pad may be used. The material of the polishing pad may be, for example, an organic polymer. Examples of the organic polymers include polyurethanes. For example, SUBA 400 (manufactured by Nitta Haas Incorporated) may be used as the polishing pad. For example, the method may be performed in such a manner that the flat glass plate is held with the polishing head, the abrasive agent is supplied between the polishing pad and the flat glass plate, and a platen or the flat glass plate is moved under a predetermined pressure so as to polish the flat glass plate while the abrasive agent is kept in contact with the flat glass plate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for producing abrasive agents, comprising:
   adding a silica to a manganese compound;
   heat-treating the manganese compound to which the silica has been added;
   forming abrasive grains by milling the manganese compound to which the silica has been added and which has been heat-treated; and
   adding a solvent to the abrasive grains.
2. The method according to claim 1, wherein
   the manganese compound is selected from a group consisting of $MnO_2$, $MnCO_3$, and $Mn(OH)_2$.
3. The method according to claim 1, wherein
   the heat-treating is performed at a temperature of not less than 800° C. and not more than 1000° C.
4. The method according to claim 1, wherein
   the heat-treating is performed so as to rapidly heat and rapidly cool the manganese compound to which the silica has been added.

5. An electronic device including a substrate polished with abrasive agents produced by process, comprising:
    adding a silica to a manganese compound;
    heat-treating the manganese compound to which the silica has been added;
    forming abrasive grains by milling the manganese compound to which the silica has been added and which has been heat-treated; and
    adding a solvent to the abrasive grains.

6. An abrasive agent, comprising:
    abrasive grains including a silica, a manganese compound and a manganese silicon oxide; and
    a solvent.

7. The abrasive agent according to claim 6, wherein the manganese compound is selected from a group consisting of $MnO_2$, $MnCO_3$, and $Mn(OH)_2$.

* * * * *